United States Patent
Summers et al.

(10) Patent No.: US 10,114,386 B2
(45) Date of Patent: Oct. 30, 2018

(54) ELECTRO-HYDRAULIC SERVO VALVE CONTROL SYSTEM

(71) Applicant: Goodrich Corporation, Charlotte, NC (US)

(72) Inventors: Camila Summers, Chandler, AZ (US); Eric Duane Ronning, Glendale, AZ (US)

(73) Assignee: GOODRICH CORPORATION, Charlotte, NC (US)

( * ) Notice: Subject to any disclaimer, the term of this patent is extended or adjusted under 35 U.S.C. 154(b) by 601 days.

(21) Appl. No.: 14/683,613

(22) Filed: Apr. 10, 2015

(65) Prior Publication Data

US 2016/0299512 A1 Oct. 13, 2016

(51) Int. Cl.
*G05D 7/06* (2006.01)
*G05B 15/02* (2006.01)
(Continued)

(52) U.S. Cl.
CPC ........... *G05D 7/0635* (2013.01); *B64C 13/00* (2013.01); *G05B 15/02* (2013.01); *G05B 19/46* (2013.01);
(Continued)

(58) Field of Classification Search
CPC ........ B64C 13/00; G05B 15/02; G05B 19/46; G05B 2219/34024; G05B 2219/41292;
(Continued)

(56) References Cited

U.S. PATENT DOCUMENTS 3,757,183 A * 9/1973 Nola ................. H02P 6/06
  318/400.04
4,794,312 A * 12/1988 Kano ................. G05B 19/237
  318/599
(Continued)

FOREIGN PATENT DOCUMENTS

CN 101576745 A 11/2009
CN 102801379 A 11/2012

OTHER PUBLICATIONS

"AN-694 A DMOS 3A, 55V, H-Bridge: The LMD18200", Apr. 1, 2013, XP055193320, Retrieved from the Internet: URL: http://www.ti.com/lit/an/snoa170c/snoa170c.pdf, Section 7, pp. 3-5, 9-12, 18 pages.

(Continued)

*Primary Examiner* — Kenneth M Lo
*Assistant Examiner* — Chad Erdman
(74) *Attorney, Agent, or Firm* — Cantor Colburn LLP

(57) ABSTRACT

A control system includes an electro-hydraulic servo valve configured to move about a plurality of positions in response to receiving an analog bi-polar current signal. An electronic field programmable gate array (FPGA) generates first and second digital pulse width modulation (PWM) signals according to an adjustable duty cycle. An electronic bridge circuit is in electrical communication with the FPGA to convert the first and second digital PWM signals into the bi-polar current signal. An electronic current sensing circuit is in electrical communication with the bridge circuit, the current sensing circuit configured to generate a digital feedback signal indicating an average current level of the bi-polar signal. The FPGA controls the duty cycle based on at least the average current level indicated by the digital feedback signal.

12 Claims, 1 Drawing Sheet

(51) Int. Cl.
*B64C 13/00* (2006.01)
*G05B 19/46* (2006.01)
*H02M 7/5387* (2007.01)

(52) U.S. Cl.
CPC . *H02M 7/5387* (2013.01); *G05B 2219/34024* (2013.01); *G05B 2219/41292* (2013.01); *G05B 2219/41317* (2013.01); *G05B 2219/41318* (2013.01); *G05B 2219/42237* (2013.01)

(58) Field of Classification Search
CPC .......... G05B 2219/41317; G05B 2219/41318; G05B 2219/42237; G05D 7/0635; H02M 7/5387
See application file for complete search history.

(56) References Cited

U.S. PATENT DOCUMENTS

| | | | | |
|---|---|---|---|---|
| 5,722,460 | A * | 3/1998 | Olsen | F15B 13/0402 137/625.65 |
| 6,034,499 | A | 3/2000 | Tranovich | |
| 2007/0279956 | A1* | 12/2007 | Grimm | F02C 9/22 363/126 |
| 2011/0000652 | A1* | 1/2011 | Takada | H02P 6/085 165/104.34 |
| 2013/0002143 | A1* | 1/2013 | Panaccio | H05B 33/0851 315/152 |
| 2013/0164013 | A1* | 6/2013 | Kondo | G03G 15/2039 399/67 |
| 2014/0306624 | A1* | 10/2014 | Namuduri | F03G 7/065 318/116 |
| 2015/0109044 | A1* | 4/2015 | Rozenbaum | H03K 5/003 327/307 |

OTHER PUBLICATIONS

Anonymous, "LMD18200 3A, 55V H-Bridge", Nov. 2, 2013, XP055310196, Retrieved from the Internet: URL: http://www.ti.com/lit/ds/symlink/lmd18200.pdf, paragrahs 0001, 0009, 0010, 0012-0014, 20 pages.

European Search Report for European Application No. 16164384.6, dated Oct. 24, 2016, 11 pages.

Wu, et al., "Development of a Direct-Drive Servo Valve With High-Frequency Voice Coil Motor and Advanced Digital Controller", IEEE/ASME Transactions on Mechatronics, vol. 19, No. 3, Jun. 1, 2014, pp. 932-942.

* cited by examiner

ELECTRO-HYDRAULIC SERVO VALVE CONTROL SYSTEM

TECHNICAL FIELD

The present invention relates generally to an aircraft electronic control system, and more particularly, to a digital electro-hydraulic servo valve control system.

BACKGROUND

Aircraft vehicles include hydraulic servo control systems that control one or more adjustable surface components such as, for example, the ailerons, rudders, and elevators. Conventional hydraulic servo control systems are based on an analog electronic topology comprising various analog electronic devices to measure one or more analog signals that indicate a current position of the surface component among a plurality of possible adjustable positions. The analog signal is then compared to an analog setpoint value (e.g., an analog voltage). The error between the analog signal and the analog setpoint value is determined, and the surface components are actively adjusted to maintain a minimum error.

The analog devices utilized to generate and measure the analog signals are susceptible to temperature changes. Consequently, as the aircraft realizes different temperatures during flight operations, various characteristics of the analog devices (e.g., gain, error, and phase margin) can vary, thereby reducing the accuracy of the analog control system. In addition, conventional analog control systems typically require multiple power sources to power the individual analog components and to define the analog setpoint values. Consequently, analog control systems are typically viewed as requiring increased power such that the overall power efficiency of the aircraft is reduced.

SUMMARY

According to embodiment, a control system includes an electro-hydraulic servo valve configured to move about a plurality of positions in response to receiving an analog bi-polar current signal. An electronic field programmable gate array (FPGA) generates first and second digital pulse width modulation (PWM) signals according to an adjustable duty cycle. An electronic bridge circuit is in electrical communication with the FPGA to convert the first and second digital PWM signals into the bi-polar current signal. An electronic current sensing circuit is in electrical communication with the bridge circuit, the current sensing circuit configured to generate a digital feedback signal indicating an average current level of the bi-polar signal. The FPGA controls the duty cycle based on at least the average current level indicated by the digital feedback signal.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
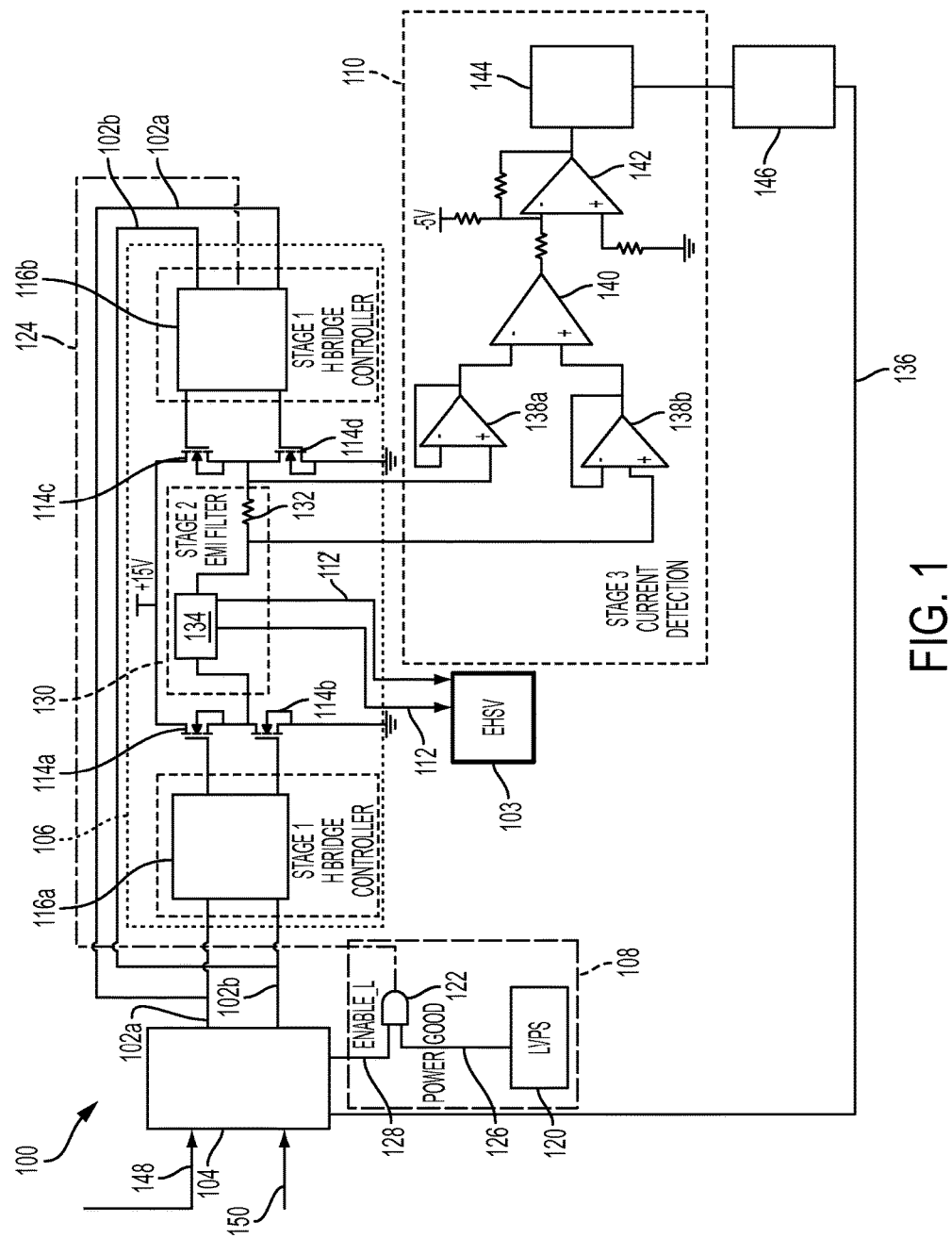
FIG. 1 is an electrical schematic of a digital electro-hydraulic servo valve control system configured to control an electro-hydraulic servo valve according to a non-limiting embodiment.

According to a non-limiting embodiment of the invention, a digitally electronic control system is configured to drive a position of electro-hydraulic servo valve about a plurality of variable positions. The control system includes an electronic field programmable gate array (FPGA) that generates first and second digital pulse width modulation (PWM) signals according to an adjustable duty cycle. An electronic bridge circuit is in electrical communication with the FPGA to convert the first and second digital PWM signals into the bi-polar current signal. The duty cycle of the PWM signals controls the current level of the bi-polar current signal. The control system further includes an electronic current sensing circuit in electrical communication with the bridge circuit. The current sensing circuit is configured to generate a digital feedback signal indicating an average current level of the bi-polar signal. In this manner, the FPGA controls the duty cycle based on at least the average current level indicated by the digital feedback signal. Since the FPGA essentially controls the current level of the bi-polar current signal, a more robust control system is provided that is unaffected by temperature changes and requires less overall operating power.

With reference now to FIG. 1, an electrical schematic of a digital electro-hydraulic servo valve control system 100 is illustrated according to a non-limiting embodiment. The digital electro-hydraulic servo valve control system 100 is configured to generate a first digital pulse-width modulated (PWM) signal 102a and a second digital pulse-width modulated (PWM) signal 102b to control a current level of a servo current signal flowing through an electro-hydraulic servo valve (EHSV) 103. The EHSV 103 is coupled to a surface component and is configured to move about a plurality of positions. The surface component includes, but is not limited to, ailerons (not shown), rudders (not shown), and elevators (not shown). The coil generates an electro-magnetic field in response to an analog bi-polar current signal flowing therethrough. The polarity of the bi-polar current signal dictates the magnetic polarity of the electro-magnetic field, and in turn controls the directional movement of the actuator as understood by one of ordinary skill in the art. Moreover, the movement of the actuator is proportional to the average current level of the bi-polar current flowing through the coil.

The digital electro-hydraulic servo valve control system 100 includes an electronic field programmable gate array (FPGA) 104, an electronic bridge circuit 106, an electronic fault detection circuit 108, and an electronic current sensing circuit 110. The FPGA 104 generates first and second digital pulse width modulation (PWM) signals according to an adjustable duty cycle. The FPGA 104 may include, for example, an integrated circuit configured to generate the first digital PWM signal 102a and the second PWM signal 102b according to a variable duty cycle (i.e., pulse width). The FPGA 100 may also include one or more memory elements configured to store data. In this manner, various algorithms and computations can be executed to perform various operations including, but not limited to, storing a desired value and comparing a measured value to the desired value. The FPGA may also be constructed as a gate array that contains up a plurality of logic gates that can be programmed in the field. The FPGA may include not only programmable logic elements, but also programmable interconnects, and switches between the elements.

The electronic bridge circuit 106 is in electrical communication with the FPGA 104 and is configured to convert the first and second digital PWM signals 102a-102b into the bi-polar current signal 112. More specifically, the electronic bridge circuit 106 includes a plurality of semiconductor switches 114 constructed, for example, as an H-bridge circuit. A first section of the H-bridge circuit 106, i.e., a first set of semiconductor switches 114a,114d, conduct positive current through the H-bridge circuit 106 during a first mode to generate a positive bi-polar current signal 112. A second section of the H-bridge circuit 106, i.e., the semiconductor switches 114b, 114c, conducts a negative bi-polar current signal 112 through the H-bridge circuit 106 when operating in a second mode. The H-bridge circuit 106 may further operate in a third mode which switches off all the semiconductor switches 114a-114d, thereby disconnecting the bi-polar current signal 112 from the EHSV 103. Accordingly, initiating the third mode of the H-bridge circuit 106 inhibits the bi-polar current signal 112 from flowing through the coil and stops movement of the EHSV 103.

According to a non-limiting embodiment, the H-bridge circuit 106 includes a first bridge driver 116a electrically connected between the FPGA 104 and the semiconductor switches 114a-114b. A second bridge driver 116b is electrically connected between the FPGA 104 and the semiconductor switches 114c-114d. Each of the first and second bridge drivers 116a-116b selectively delivers the first and second PWM signals 102a-102b to the semiconductor switches 114a-114d, respectively, to achieve the first and second operating modes of the H-bridge circuit 106.

The control system 100 includes an electronic fault detection circuit 108 driven by a low voltage power supply 120. The control system 100 further includes a fault switch 122 comprising a logic circuit 122. According to a non-limiting embodiment, the logic gate 122 is an AND gate, where both signals are active high. According to another non-limiting embodiment, the logic circuit 122 is an OR gate, where both signals are active low. According to a non-limiting embodiment, the fault detection circuit 108 outputs a fault signal 124 when the low voltage power supply 120 and/or the FPGA 104 outputs a respective fault control signals 126-128. For example, the low voltage power supply 120 outputs a "power_good" signal 126 to the logic circuit 122 if the power falls under an acceptable range of the low voltage power supply 120. The FPGA 104 outputs an "enable" signal 128 when the FPGA 104 is operating properly, and outputs a "disable" signal 128 when a fault exists in the FPGA. In response to receiving the fault signal 124, each of the first bridge driver 116a and the second bridge driver 116b disconnect the PWM signals 102a-102b from the respective semiconductor switches 114a-114b. Accordingly, a fault occurring in either of the FPGA 104 and/or the low voltage power supply 120 is prevented from generating an erroneous bi-polar current signal 112 and improperly moving the actuator of the EHSV 103.

The H-bridge circuit 106 further includes an electronic filter unit 130 which is interposed between the H-bridge circuit 106 and the EHSV 103. The electronic filter unit 130 includes a resistor 132, and a noise filter 134. The resistor 132 is connected between the noise filter 134 and the semiconductor switches 114c and 114d and may be utilized as a voltage measuring component as discussed in greater detail below. The noise filter 134 is connected in parallel with the EHSV 103 and is configured to reduce or eliminate electromagnetic interference from the bi-polar current signal 112.

The current sensing circuit 110 includes a pair of inputs that receive first and second measured voltages, respectively, and an output that generates a digital feedback signal 136 to the FPGA 104. More specifically, the first input of the current sensing circuit 110 receives a measured voltage taken upstream from the resistor 132, and the second input receives a measured voltage taken downstream from the resistor 132. In this manner, the voltage across resistor 132 is measured by the current sensing circuit 110 and is converted into the digital feedback signal 136 which is output to the FPGA 104 and is utilized to determine the average current of the bi-polar current signal 112 as discussed in greater detail below. Although a resistor 132 is illustrated, is should be appreciated that the resistor 132 can be omitted, and other components can be used to provide the average current of the bi-polar current signal 112 to the EHSV 103 including, but not limited to, a current transformer (not shown).

According to a non-limiting embodiment, the current sensing circuit 110 includes a pair of buffered operational amplifiers (OPAMPs) 138a-138b and a differential OPAMP 140. The first buffered OPAMP 138a receives the first voltage input taken upstream from the resistor 132 and the second buffered OPAMP 138b receives the second voltage input taken downstream from the resistor 132. The first and second buffered OPAMPs 138a-138b are each configured to increase the common mode range of the first and second voltage inputs, respectively. The differential OPAMP 140 includes a first input that receives the buffered output from the first buffer OPAMP 138a and a second input that receives the second buffered output of the second buffered OPAMP 138b and is configured to output a difference between the first measured voltage taken upstream from the resistor 132 and the second measured voltage taken downstream from the resistor 132. The voltage differential output by the difference amplifier 140 is proportional to the average current generated by the H-bridge circuit 106, i.e., the bi-polar current signal 112.

The current sensing signal 110 further includes an offset OPAMP 142, a current clamp circuit 144, and an analog-to-digital (A/D) converter 146. The A/D converter 146 typically has limits as to the input values. For example, the A/D converter 146 may require positive input values being a maximum voltage value. Accordingly, the offset OPAMP 142 may receive the output from the difference amplifier 140 and may apply a preset gain to the difference amplifier output, i.e., the measured voltage differential, to maintain the difference OPAMP output in a voltage range that is acceptable for the A/D converter 146. The current clamp circuit 144 receives the amplified output from the offset OPAMP 142 and scales the output at a particular polarity, e.g., a positive voltage signal. In this manner, when the H-bridge circuit 106 is operating in the second mode which generates negative current flow, the negative voltage value output from the offset OPAMP 142 is converted into a positive voltage signal which is then input to the A/D converter 146. According to an embodiment, the offset OPAMP 142 is configured to convert the bipolar current values into a unipolar current reading having a zero current reading midpoint in the input voltage range of the A/D converter 146. Current readings below the midpoint value represent negative current values while current readings above the midpoint value represent positive current values.

The A/D converter 146 receives the amplified and clamped analog voltage differential and converts the analog voltage differential into a digital signal indicating the voltage differential across resistor 132. The digital signal 136 is then fed back to the FPGA 104 where it is analyzed to determine the average current generated by the H-bridge circuit 106, i.e., the bi-polar current signal 112. For instance, the voltage differential across resistor 132 is proportional to the average current generated by the H-bridge circuit 106. Therefore, the FPGA 104 is programmed to execute various algorithms that calculate the average current generated by the H-bridge circuit 106 based on the voltage differential across resistor 132 as indicated by the digital feedback signal 136.

According to a non-limiting embodiment, the FPGA 104 may receive a desired servo position signal 148 and a current servo position signal 150. The desired servo position signal 148 is generated by an aircraft control module in response to receiving one or more commands from the aircraft operator. For example, an aircraft operator may input a command that adjusts the position of one or more surface components such as, for example, an aileron. In response to the operator's input, the aircraft control module outputs the desired servo position signal 148 which indicates the desired position of the corresponding surface component. The surface component may include one or more sensors that output the actual servo position signal 150, which represents the actual position of the corresponding surface component. In order to move the EHSV 103 to achieve the desired position indicated by the desired servo position signal 148, the FPGA 104 generates the first or second PWM signal 102a-102b. For example, when the surface component is required to be moved in a first direction, the FPGA 104 outputs the first PWM signal 102a such that the EHSV 103 is moved in a first direction. When, however, the surface component is required to move in an opposite direction, the FPGA 104 generates the second PWM signal 102b such that the EHSV 103 is moved in a second direction opposite the first direction. As described above, each of the first and second PWM signals 102a-102b are converted into the analog bi-polar current signal 112 using the H-bridge circuit 106. While the bi-polar current signal 112 drives the movement of the EHSV 103, the current sensing circuit 110 continuously monitors the voltage differential across the resistor 132. In this manner, the FPGA 104 continuously monitors the average current of the bi-polar current signal 112. When the actual servo position signal 150 matches or substantially matches the desired servo position signal 148, the FPGA 104 disconnects the first and second PWM signals 102a-102b such that movement of the EHSV 103 is stopped and the surface component is maintained in the desired position indicated by the desired servo position signal 148.

The EHSV 103 control system 100, according to various embodiments of the invention, provides lower costs and higher accuracy when compared to conventional control systems utilizing only an analog approach. Moreover, since the digital EHSV 103 control system 100 eliminates various analog components, the overall size of the circuit board can be reduced. Furthermore, since the FPGA essentially performs an internal execution of the control loop to determine the average current of the bi-polar current signal 112, a more robust EHSV 103 control system is provided that is less susceptible to the errors and inaccuracies caused by temperature changes realized during flight operation.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

According to the descriptions above, term "module", as used herein, refers to logic embodied in hardware or firmware, or to a collection of computer readable software instructions, written in a programming language including, but not limited to, Java, C, or assembly, and which is executed by one or more electronic microprocessors. One or more software instructions in the modules may be embedded in firmware, such as, for example, in an EPROM, and/or stored in any type of non-transitory computer-readable medium or other storage device.

The invention claimed is:

1. A control system comprising:
    an electro-hydraulic servo valve configured to move about a plurality of positions in response to receiving an analog bi-polar current signal;
    an electronic field programmable gate array (FPGA) that generates first and second digital pulse width modulation (PWM) signals according to an adjustable duty cycle;
    an electronic bridge circuit in electrical communication with the FPGA to convert the first and second digital PWM signals into the bi-polar current signal, the electronic bridge circuit is configured to drive a plurality of switching devices that output the bi-polar current signal in response to the first and second PWM signals, the duty cycle of the PWM signals controlling the average current level of the bi-polar current signal, the plurality of switching devices are configured as an H-bridge circuit, a first section of the plurality of switching devices generating the bi-polar current signal having a first polarity to move the electro-hydraulic servo valve in a first direction and a second section of the plurality of switching devices generating the bi-polar current signal having a second polarity opposite the first direction to move the electro-hydraulic servo valve in a second direction opposite the first direction; and
    an electronic current sensing circuit in electrical communication with the bridge circuit, the current sensing circuit configured to generate a digital feedback signal indicating an average current level of the bi-polar signal; and
    an electronic filter unit interposed between the H-bridge circuit and the electro-hydraulic servo valve,
    wherein the FPGA controls the duty cycle based on at least the average current level indicated by the digital feedback signal, and
    wherein the electronic current sensing circuit measures a voltage differential corresponding to the bi-polar current signal and generates an offset analog average current level signal indicating the average current level of the bi-polar current signal based on the voltage differential.

2. The control system of claim 1, wherein the electronic current sensing circuit further comprises an analog-to-digital converter that converts the analog average current level signal into the digital feedback signal, and further comprises an offset circuit that converts an analog average current level signal to a midpoint of an input value that is input to the analog-to-digital converter to determine negative current values below the midpoint and positive current values above the midpoint value.

3. The control system of claim 2, further comprising an electronic current clamping circuit that limits a range of input values that are input to the analog-to-digital converter.

4. The control system of claim 3, further comprising an electronic fault detection circuit in electrical communication with the FPGA and the H-bridge circuit, the fault detection circuit configured to output a fault signal in response to detecting at least one fault corresponding to a low-voltage power supply or a fault corresponding to the FPGA.

5. The control system of claim 4, wherein the H-bridge circuit is switched off in response receiving the fault signal such that the bi-polar current signal is disconnected from the electro-hydraulic servo valve.

6. The control system of claim 1, wherein the FPGA receives a position signal indicating a position of the electro-hydraulic servo valve, and adjusts the duty cycle based on the digital feedback signal and the position signal.

7. A method of controlling an electro-hydraulic servo valve configured to move about a plurality of positions, the method comprising:
    generating first and second digital pulse width modulation (PWM) signals according to an adjustable duty cycle;
    electronically converting the first and second digital PWM signals into an analog bi-polar current signal that drives movement of the electro-hydraulic servo valve;
    electrically driving a plurality of switching devices that output the bi-polar current signal in response to the first and second PWM signals, and controlling the average current level of the bi-polar current signal based on the duty cycle of the PWM signals;
    filtering electrical noise from the bi-polar current signal using an electronic filter unit interposed between an H-bridge circuit and the electro-hydraulic servo valve;
    generating a digital feedback signal indicating an average current level of the bi-polar signal; and
    controlling the duty cycle based on at least the average current level indicated by the digital feedback signal, wherein outputting the bi-polar current comprises generating a first portion of the bi-polar current signal having a first polarity to move the electro-hydraulic servo valve in a first direction in response to electrically driving a first section of the plurality of switching devices generating, and generating a second portion of the bi-polar current signal having a second polarity opposite the first direction to move the electro-hydraulic servo valve in a second direction opposite the first direction in response to electrically driving a second section of the plurality of switching devices.

8. The method of claim 7, further comprising electrically converting the analog average current level signal into the digital feedback signal using an analog-to-digital converter.

9. The method of claim 8, further comprising electrically converting an analog average current level signal to a midpoint of an input value that is input to the analog-to-digital converter to determine negative current values below the midpoint and positive current values above the midpoint value.

10. The method of claim 9, further comprising outputting a fault signal in response to detecting at least one fault corresponding to a low-voltage power supply or a fault corresponding to the FPGA.

11. The method of claim 10, further comprising disconnecting the bi-polar current signal from the electro-hydraulic servo valve based on the fault signal.

12. The method of claim 7, further comprising determining a position of the electro-hydraulic servo valve, generating a position signal indicating the position of the electro-hydraulic servo valve, and adjusting the duty cycle based on the digital feedback signal and the position signal.

\* \* \* \* \*